(12) United States Patent
Cheng et al.

(10) Patent No.: US 9,554,113 B2
(45) Date of Patent: Jan. 24, 2017

(54) VIDEO FRAME PROCESSING METHOD

(71) Applicant: MEDIATEK INC., Hsin-Chu (TW)

(72) Inventors: Chia-Ming Cheng, Hsinchu (TW);
Po-Hao Huang, Kaohsiung (TW);
Yuan-Chung Lee, Tainan (TW);
Chung-Hung Tsai, Hsin-Chu Hsien (TW); Chi-Cheng Ju, Hsinchu (TW);
Ding-Yun Chen, Taipei (TW);
Cheng-Tsai Ho, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 289 days.

(21) Appl. No.: 14/221,229

(22) Filed: Mar. 20, 2014

(65) Prior Publication Data

US 2014/0285621 A1 Sep. 25, 2014

Related U.S. Application Data

(60) Provisional application No. 61/803,881, filed on Mar. 21, 2013.

(51) Int. Cl.
*H04N 15/00* (2006.01)
*H04N 13/00* (2006.01)
*H04N 13/02* (2006.01)

(52) U.S. Cl.
CPC ...... *H04N 13/0011* (2013.01); *H04N 13/0007* (2013.01); *H04N 13/0239* (2013.01); *H04N 13/0242* (2013.01); *H04N 13/0282* (2013.01)

(58) Field of Classification Search
USPC ..................................... 348/42–43
See application file for complete search history.

(56) References Cited

U.S. PATENT DOCUMENTS 7,170,492 B2   1/2007   Bell
9,100,637 B2   8/2015   Koike
(Continued)

FOREIGN PATENT DOCUMENTS

CN   101627635 A   1/2010
CN   101799939 A   8/2010
(Continued)

OTHER PUBLICATIONS

"International Search Report" mailed on Jun. 30, 2014 for International application No. PCT/CN2014/073882, International filing date:Mar. 21, 2014.

(Continued)

*Primary Examiner* — Nigar Chowdhury
(74) *Attorney, Agent, or Firm* — Winston Hsu; Scott Margo (57) ABSTRACT

A video frame processing method, which comprises: (a) capturing at least two video frames via a multi-view camera system comprising a plurality of cameras; (b) recording timestamps for each the video frame; (c) determining a major camera and a first sub camera out of the multi-view camera system, based on the timestamps, wherein the major camera captures a major video sequence comprising at least one major video frame, the first sub camera captures a video sequence of first view comprising at least one video frame of first view; (d) generating a first reference video frame of first view according to one first reference major video frame of the major video frames, which is at a reference timestamp corresponding to the first reference video frame of first view, and according to at least one the video frame of first view surrounding the reference timestamp; and (e) generating a multi-view video sequence comprising a first multi-view video frame, wherein the first multi-view video frame is (Continued)

generated based on the first reference video frame of first view and the first reference major video frame.

28 Claims, 11 Drawing Sheets

(56) References Cited

U.S. PATENT DOCUMENTS

| | | |
|---|---|---|
| 2008/0219654 A1 | 9/2008 | Border |
| 2010/0231692 A1* | 9/2010 | Perlman .................. G06F 3/005 |
| | | 348/48 |
| 2012/0044327 A1* | 2/2012 | Horita .................... G01C 11/06 |
| | | 348/47 |
| 2012/0176481 A1* | 7/2012 | Lukk .................. H04N 13/0011 |
| | | 348/47 |
| 2012/0195583 A1 | 8/2012 | Pace |
| 2013/0100255 A1* | 4/2013 | Ohba .................... G06T 3/4038 |
| | | 348/47 |
| 2014/0092439 A1 | 4/2014 | Krig |
| 2014/0218478 A1 | 8/2014 | Lang |

FOREIGN PATENT DOCUMENTS

| | | |
|---|---|---|
| CN | 102271269 A | 12/2011 |
| CN | 102769763 A | 11/2012 |
| CN | 102783158 A | 11/2012 |
| CN | 102892008 A | 1/2013 |
| JP | P20093507 A | 1/2009 |
| TW | 201216679 A1 | 4/2012 |
| WO | 2005120083 A1 | 12/2005 |

OTHER PUBLICATIONS

"International Search Report" mailed on Jun. 25, 2014 for International application No. PCT/CN2014/073857, International filing date:Mar. 21, 2014.

Chi-Cheng Ju et al., Title: Video Frame Processing Method, pending U.S. Appl. No. 14,221,260, filed Mar. 20, 2014.

\* cited by examiner

VIDEO FRAME PROCESSING METHOD

CROSS REFERENCE TO RELATED APPLICATIONS

This application claims the provisional application, which is U.S. Provisional Application No. 61/803,881, filed Mar. 21, 2013, and is included herein by reference.

BACKGROUND

Conventionally, a camera captures a video frame via a camera parameter. The camera parameter can have, for example, a video frame capturing parameter such as an exposure time. Alternatively, the camera parameter can have other parameters, such as a video frame rate. Exposure time (or named shutter speed) is the effective length of time a camera's shutter is open. Exposure time along with the aperture of the lens (also called f-number) determines the amount of light that reaches the film or an image sensor inside the camera. Long exposure time will cause image blur easily. On the contrary, short exposure time will cause image dark or noise easily. The aperture or camera sensor is always small in a camera phone (or a smartphone). When image resolution increases, the amount of light of each pixel will decrease. Therefore, it is hard to set a balanced camera parameter to generate a fine video frame.

A stereo camera is a type of camera with two or more cameras (or named a multi-view stereo camera) with a separate image sensor for each camera. A stereo camera is always used to generate a multi-view video frame (ex. a 3D video frame) based on the video frames generated from different cameras. Different cameras of the stereo camera may apply different camera parameters.

However, the spec of the multi-view video frame output may base on a lower camera parameter that can be covered by a higher camera parameter. For example, spec of the multi-view video frame output may base on the lower frame rate. That is, if a left camera has a frame rate of 60 fps and a right camera has a frame rate of 30 fps, the frame rate of the multi-view video frame output is 30 fps. Additionally, the spec of the multi-view video frame output may base on the lower image resolution. For example, if a left camera has an image resolution of 8 M and a right camera has an image resolution of 2 M, the image resolution of the multi-view video frame output is 2 M.

SUMMARY

Therefore, one objective of the present application is providing a video frame processing method that can generate a multi-view video frame via at least one better camera parameter.

One embodiment of the present application discloses: a video frame processing method, which comprises: (a) capturing at least two video frames via a multi-view camera system comprising a plurality of cameras; (b) recording timestamps for each the video frame; (c) determining a major camera and a first sub camera out of the multi-view camera system, based on the timestamps, wherein the major camera captures a major video sequence comprising at least one major video frame, the first sub camera captures a video sequence of first view comprising at least one video frame of first view; (d) generating a first reference video frame of first view according to one first reference major video frame of the major video frames, which is at a reference timestamp corresponding to the first reference video frame of first view, and according to at least one the video frame of first view surrounding the reference timestamp; and (e) generating a multi-view video sequence comprising a first multi-view video frame, wherein the first multi-view video frame is generated based on the first reference video frame of first view and the first reference major video frame.

Another embodiment of the present application discloses: A video frame processing method, which comprises: (a) capturing at least two video frames via a multi-view camera system comprising a plurality of cameras; (b) determining a major camera and a first sub camera out of the multi-view camera system, based on camera parameters of the cameras, wherein the major camera captures a major video sequence comprising at least one major video frame, the first sub camera captures a video sequence of first view comprising at least one video frame of first view; (c) generating a first updated video frame of first view based on a first major video frame captured by the major camera and a first video frame of first view captured by the first sub camera; (d) generating a second updated video frame of first view based on a second major video frame captured by the major camera and a second video frame captured by the first sub camera; (e) generating a first reference video frame of first view according to the first updated video frame of first view and the second updated video frame of first view; and (f) generating a multi-view video sequence comprising a first multi-view video frame, wherein the first multi-view video frame is generated based on the first reference video frame of first view and a first reference major video frame of the major video frames.

In view of above-mentioned embodiments, the multi-view video frames can be output at a highest frame rate and/or a best image capturing parameter. Therefore, the issue for the related art can be resolved.

These and other objectives of the present invention will no doubt become obvious to those of ordinary skill in the art after reading the following detailed description of the preferred embodiment that is illustrated in the various figures and drawings.

DETAILED DESCRIPTION

One concept of the present application can be summarized as: capturing at least two video sequences via different cameras in a multi-view camera system; recording the timestamps of each corresponding video frame; determining one major camera out of the multi-view camera system, regarding the video sequence captured by the major camera as the major video sequence to be referenced; setting the rest of the camera(s) as the sub camera(s), regarding the video sequence(s) from the sub camera(s) as sub video sequence(s); generating a new video frame for the sub video sequence(s) according to the corresponding frame of the major video sequence captured at a time point, and at least one video frame captured before or after the time point by the sub camera(s); and generating a frame of the synchronized multi-view video sequence corresponding to the time point. In one example, the multi-view video sequence is output to a display for displaying, but not limited.

Please note in the following embodiments, the notations for the video frames are represented as {I(1,1), I(1,2), ... I(1,$n_1$)}, {I(2,1), I(2,2), ... I(2,$n_2$)}, ... {I(m,1), I(m,2), ... I(m,$n_m$)}, which respectively indicate the video frames from a camera 1, a camera 2 ... and a camera m (where m is a positive integer). However, such notations are simplified notations. Detailedly, the video frames of the camera can be represented as I(c1,t(c1,f1)), I(c1, t(c1,f2)), ... I(c1,t(c1,$fn_1$)), the video frames of the camera 2 can be represented as I(c2,t(c2,f1)), I(c2,t(c2,f2)), ... I(c2,t(c2,$fn_2$)), and video frames of the camera m can be represented as I(cm,t(cm,f1)), I(cm,t(cm, f2)), ... I(cm,t (cm,$fn_m$)). Wherein c# indicates the camera index, f# indicates the frame index, and t(c#,f#) indicates the timestamp of the corresponding frame of the corresponding camera. Taking the video frame with the notation of I(c1,t(c1,f1)) as an example, c1 indicates the video frame is from the camera 1, f1 indicates the video frame is a first frame of the video sequence captured by the camera 1, and t(c1,f1) is the timestamp of the video frame indicating the time at which the video frame is captured by the camera 1. For ease of readability, the above notation is simplified to be represented by {I(1,1), I(1,2), ... I(1,$n_1$)} {I(2,1), I(2,2), ... I(2,$n_2$)} {I(m,1), I(m,2), ... I(m,$n_m$)}, that the first item of the parentheses indicates the camera index and the second item indicates the timestamp, as shown in the following embodiments.

Additionally, please note the cameras described below do not limit to independent cameras. The cameras maybe a plurality of lenses provided on a single electronic device, utilizing one or more image sensors. It would be appreciated that the cameras capture the video sequences from different view angles.

Figure 1:
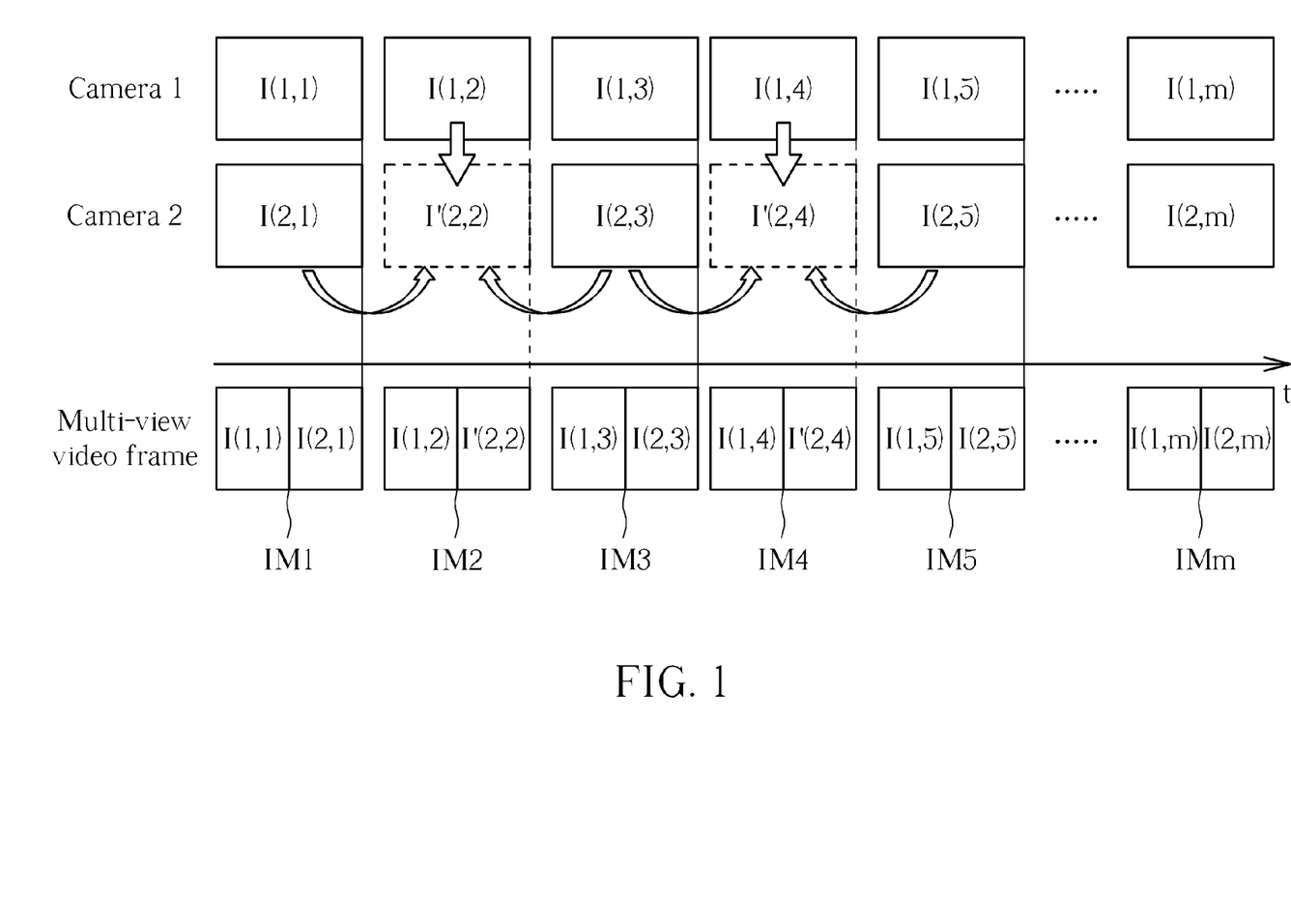
FIG. 1 is a schematic diagram illustrating a video frame processing method according to one embodiment of the present application.

FIG. 1 is a schematic diagram illustrating a video frame processing method according to one embodiment of the present application. As shown in FIG. 1, a camera 1 and a camera 2 are provided, and the camera 1 has a frame rate higher than which of the camera 2. That is, the camera 1 captures frames for each timestamp, but the camera 2 only captures frames at odd timestamps. In one embodiment, the camera 1 is a left camera and the camera 2 is a right camera, which are separated by an interocular distance, but not limited. As above-mentioned, the timestamps of each corresponding video frame are recorded, thus the frame rate for each camera can be determined by the timestamps. After the frame rates are determined, a major camera and at least one sub camera are set according to the frame rates. In this embodiment, the camera 1 having a highest frame rate is set as the major camera and the camera 2 having a lower frame rate is set as a sub camera. Therefore, the camera 1 in FIG. 1 is the major camera capturing a major video sequence comprising one or more major video frames I(1,1), I(1,2)...I(1,m), and the camera 2 is a sub camera capturing a video sequence of first view comprising one or more video frames of first view I(2,1), I(2,3), I(2,5)...I(2,m).

In one embodiment, a multi-view video frame corresponding to a specific time is generated according to both the major video frame and the video frame of first view if the major video frame captured at the specific time and the video frame of first view captured at the specific time both exist. For example, the timestamps t(c1,f1) of the major video frame I(1,1) and the timestamps t(c2,f1) of the video frame of first view I(2,1) have the same time value, which means that the major video frame I(1,1) and the video frame of first view I(2,1) are captured simultaneously. Therefore, the multi-view video frame IM1 is generated according to the major video frame I(1,1) and the video frame of first view I(2,1). The multi-view video frames corresponding to the odd timestamps, such as multi-view video frames IM3, IM5, can be generated by the same manner.

However, if the major video frame captured at the specific time exists while the video frame of first view captured at the specific time does not exist, a reference video frame of first view has to be generated before generating the multi-view video frame corresponding to the specific time. For example, by comparing the timestamps of the major video frames with the timestamps of the video frame of first view, it can be found out that the video frame of first view captured at the time point at which the major video frame I(1,2) is captured does not exist, thus a reference video frame of first view I'(2,2) corresponding to the timestamp t(c2,f2) is generated according to the first reference major video frame I(1,2) and according to at least one of the video frames of first view I(2,1) and I(2,3) captured before or after the time indicated by the timestamp t(c2,f2). Then, the multi-view video frame IM2 is generated according to the first reference major video frame I(1,2) and the reference video frame of first view I'(2,2). In this embodiment, the timestamp of the newly generated reference video frame of first view is referred to as the reference timestamp. In one embodiment, the reference video frame of first view (ex. I'(2,2)) is interpolated from at least one the video frame of first view surrounding the reference timestamp (ex. I(2,1), I(2,3)), and geometrically constrained by the first reference major video frame (ex. I(1,2)). The multi-view video frames corresponding to the even timestamps, such as the multi-view video frames IM2, IM4, can be generated by the same manner. Please note, the reference video frame of first view is not limited to be interpolated from video frames closest to which, for example, the reference video frame of first view I'(2,2) can be interpolated from a video frame of first view after the video frame of first view I(2,3). That is, any temporally adjacent video frame of first view can be used for generating the reference video frame of first view.

Via continuously performing the above-mentioned steps, a synchronized multi-view video sequence, which comprises multi-view video frames (e.g., IM1 to IMm) and has the same frame rate as which of the major video sequence, can be acquired. Please note, the number for cameras is not limited to two as illustrated in FIG. 1. The number of cameras can be more than 2, which will be illustrated as below. Also, please note the setting for video frames are not limited to which illustrated in FIG. 1. For example, at least part of the major video frames I(1,1) to I(1,m) can have different image resolutions. Additionally, at least part of the video frames of first view I(2,1) to I(2,m) can have different image resolutions. Such variation should also fall in the scope of the present application.

Figure 2:
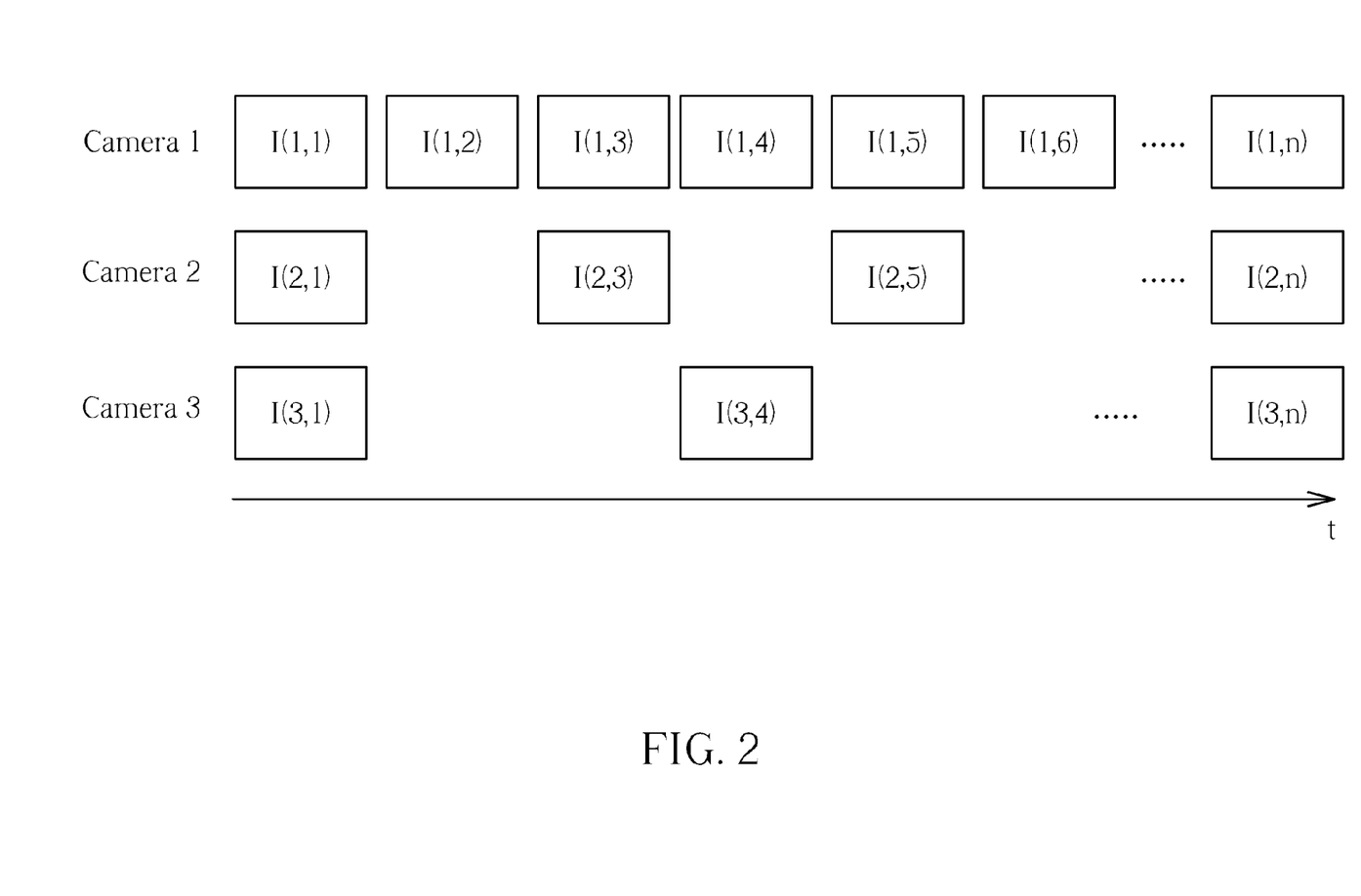
FIG. 2 and FIG. 3 are schematic diagrams illustrating a video frame processing method according to another embodiment of the present application.
Figure 3:
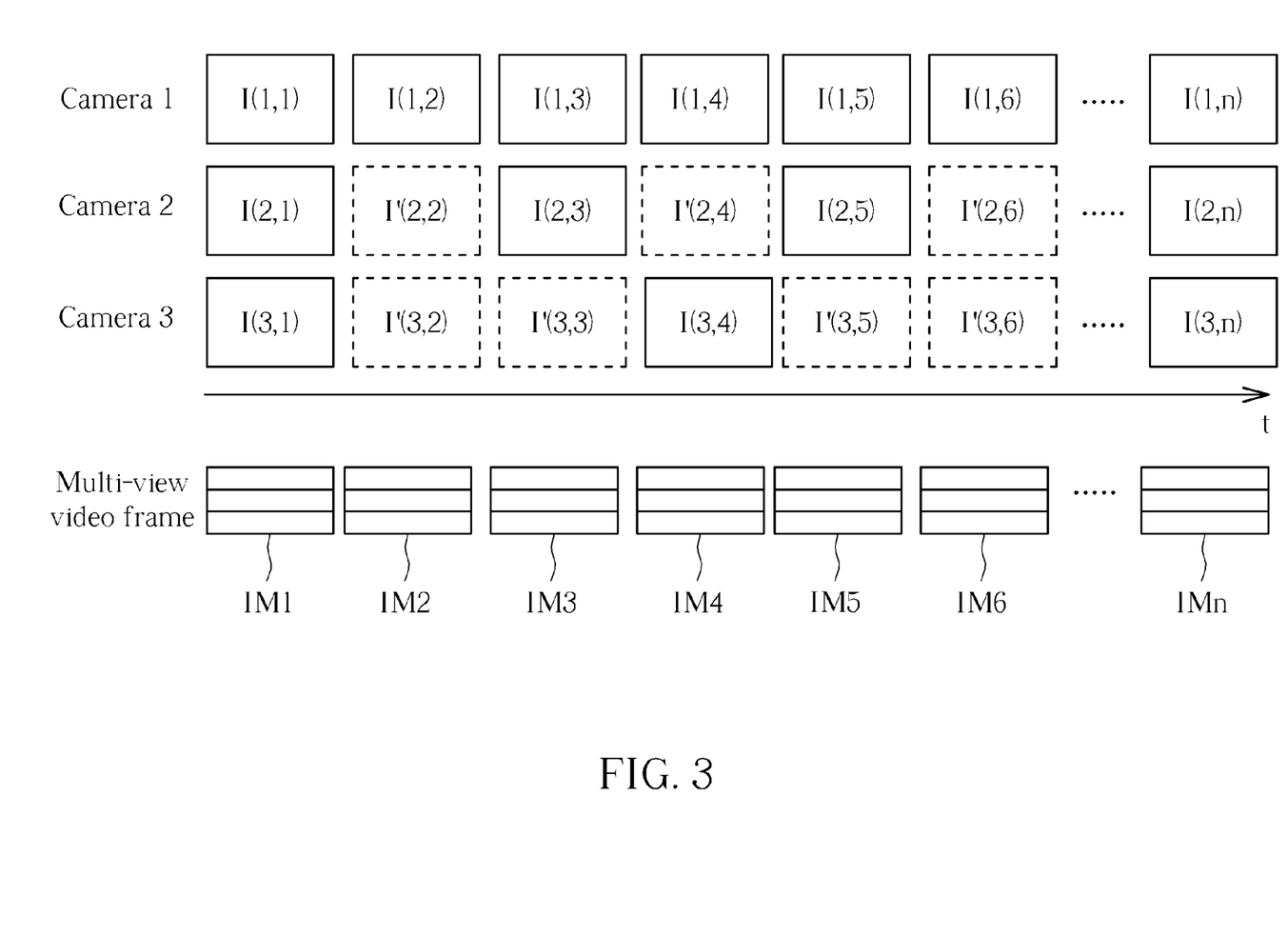

In the following embodiments, more than two cameras are provided, rather than two cameras in FIG. 1. FIG. 2 and FIG. 3 are schematic diagrams illustrating a video frame processing method according to another embodiment of the present application. In the following embodiments, three cameras are provided. However, please note more than three cameras can be applied with the same manner to the present application. As shown in FIG. 2, a camera 3 is further provided, which generate a plurality of video frames of second view I(3,1), I(3,4). . . I(3,n) at a frame rate different from which of the camera 1 and/or the camera 2. It would be appreciated that the cameras 1, 2 and 3 capture the video sequences from different view angles. Also, in the embodiments of FIG. 2 and FIG. 3, the camera 1 is still selected as the major camera, since it has a highest frame rate. Therefore, the camera 2 and the camera 3 are both sub cameras.

Please refer to FIG. 3, which illustrates an example of generating a multi-view video frame if more than two cameras are provided. In such embodiment, if a video frame captured at a particular timestamp by any of the sub cameras does not exist, a reference video frame is generated, and then a multi-view video frame is generated based on the reference video frame. To be specific, the particular timestamp indicates a time at which a video frame is captured by the major camera while at least one of the sub cameras does not capture any frames. For example, since the video frame captured at the timestamp t(c3,f3) by the camera 3 does not exist, a reference video frame of second view I'(3,3) is interpolated from the video frame of second views I(3,1) and I(3,4), and geometrically constrained by the reference major video frame I(1,3). After that, the multi-view video frame IM3 is generated from the reference major video frame I(1,3), the video frame of first view I(2,3) and the reference video frame of second view I'(3,3). Please note, the reference video frame of second view is not limited to be interpolated from video frames closest to which, for example, the reference video frame of second view I'(3,3) can be interpolated from a video frame of second view after the video frame of second view I(3,4) and geometrically constrained by the reference major video frame I(1,3). That is, any temporally adjacent video frame of second view can be used for generating the reference video frame of second view.

Additionally, the multi-view video frames in FIG. 3 can be generated from reference video frames of more than one view. For example, corresponding to the reference major video frame I(1,2), a reference video frame of first view I'(2,2) is interpolated from the video frames of first view I(2,1) and I(2,3) and geometrically constrained by the reference major video frame I(1,2), and a reference video frame of second view I'(3,2) is interpolated from the video frames of second view I(3,1) and I(3,4) and geometrically constrained by the reference major video frame I(1,2). After that, the multi-view video frame IM2 is generated from the reference major video frame I(1,2), the reference video frame of first view I'(2,2), and the reference video frame of second view I'(3,2).

Also, the multi-view video frame can be generated without reference video frames. For example, the multi-view video frame IM1 is generated according to the reference major video frame I(1,1), the video frame of first view I(2,1), and the video frame of second view I(3,1). Via the operations illustrated in FIG. 3, a multi-view video sequence, which comprises the multi-view video frames IM1, IM2 . . . IMn and is outputted at a frame rate the same as which of the major camera, can be acquired.

Figure 4:
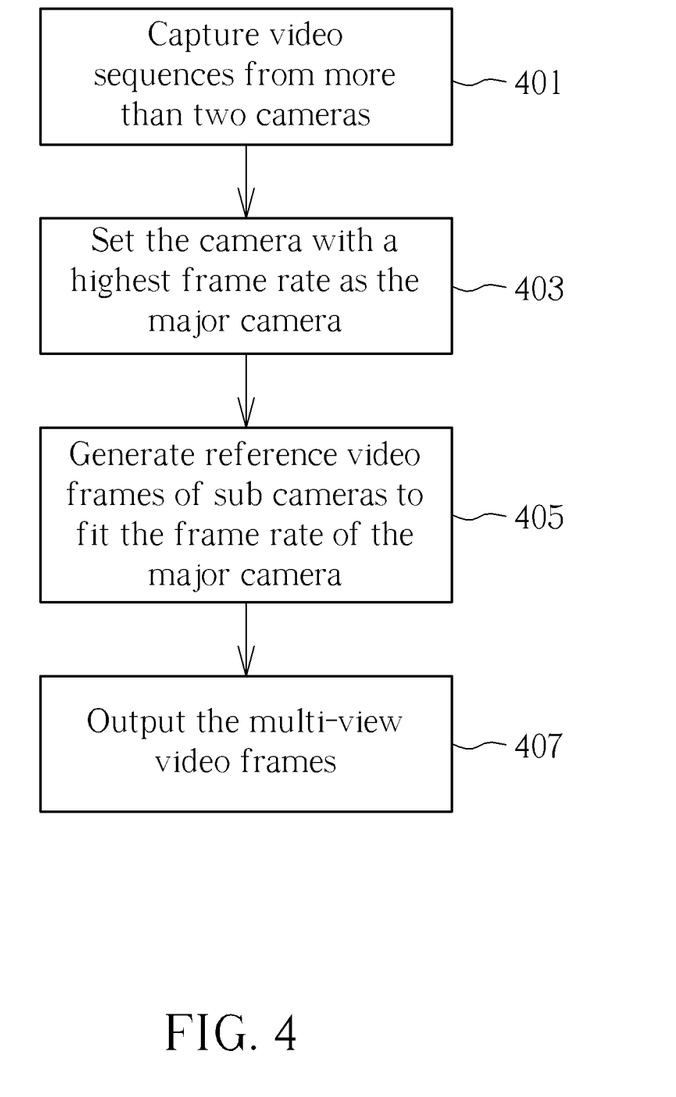
FIG. 4 is a flow chart illustrating the steps for the video frame processing method illustrated in FIG. 2 and FIG. 3, according to one embodiment of the present application.

FIG. 4 is a flow chart illustrating the steps for the video frame processing method illustrated in FIG. 2 and FIG. 3, according to one embodiment of the present application. FIG. 4 comprises the following steps:

Step 401

Capture video sequences from more than two cameras. In one embodiment, these cameras operate at different frame rates.

Step 403

Set the camera with a highest frame rate as the major camera (ex. camera 1 in FIG. 2 and FIG. 3).

Step 405

Generate reference video frames of sub cameras to fit the frame rate of the major camera (ex. the reference video frames I'(2,2), I'(3,2), I'(3,3) . . . ). In one embodiment, each reference video frame is interpolated from the temporally adjacent video frames, and constrained by the corresponding major video frame. That is, each new-generated reference video frame will be constrained by the geometry information between the major camera and the corresponding sub camera.

Step 407

Generate the multi-view video frames, according to original video frames and/or reference video frames generated from the original video frames. In which, the original video frames are video frames captured by the cameras, which maybe the video frames from the major camera or the video frames from the sub-camera. For example, in FIG. 2 the major video frame I(1,1), the video frame of first view I(2,1) and the video frame of second vide I(3,1) are all original video frames.

Figure 5:
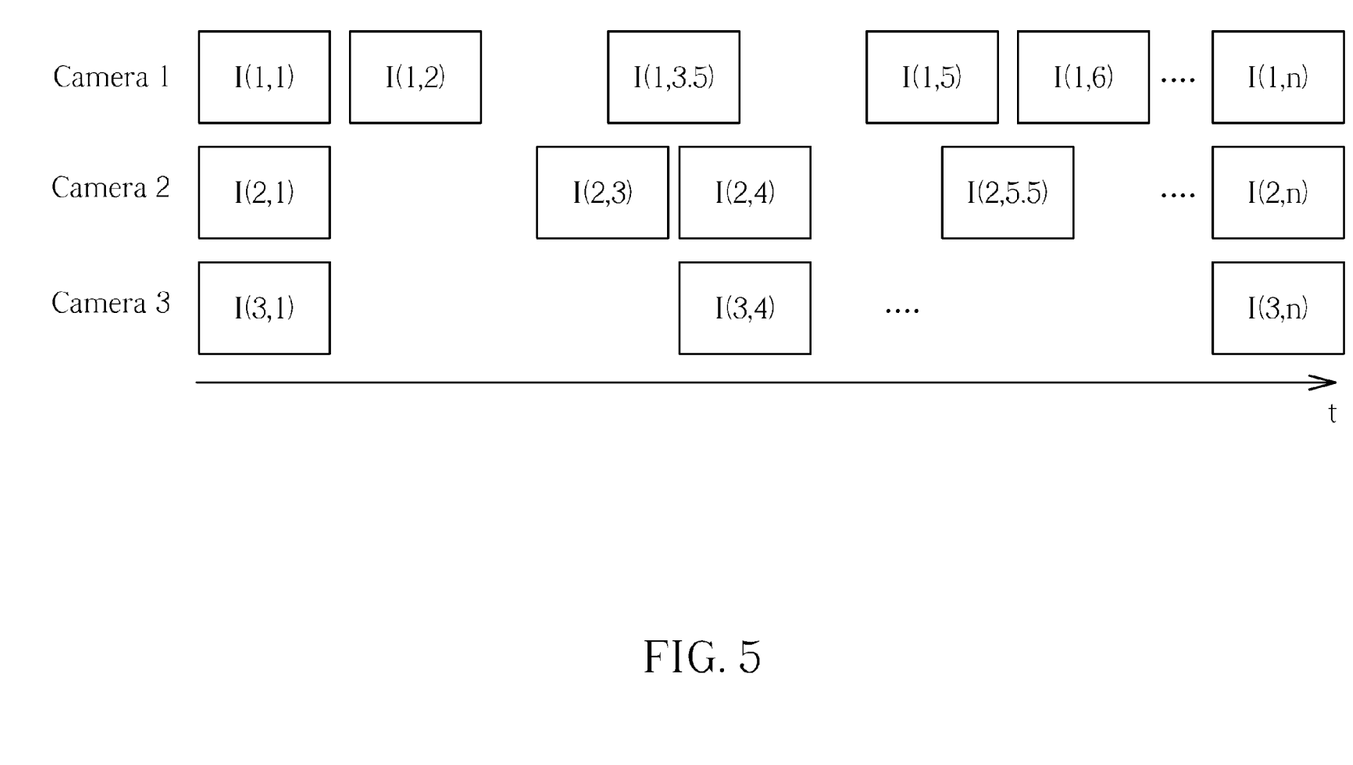
FIG. 5, FIG. 6A and FIG. 6B are schematic diagrams illustrating a video frame processing method according to still another embodiment of the present application.
Figure 6A:
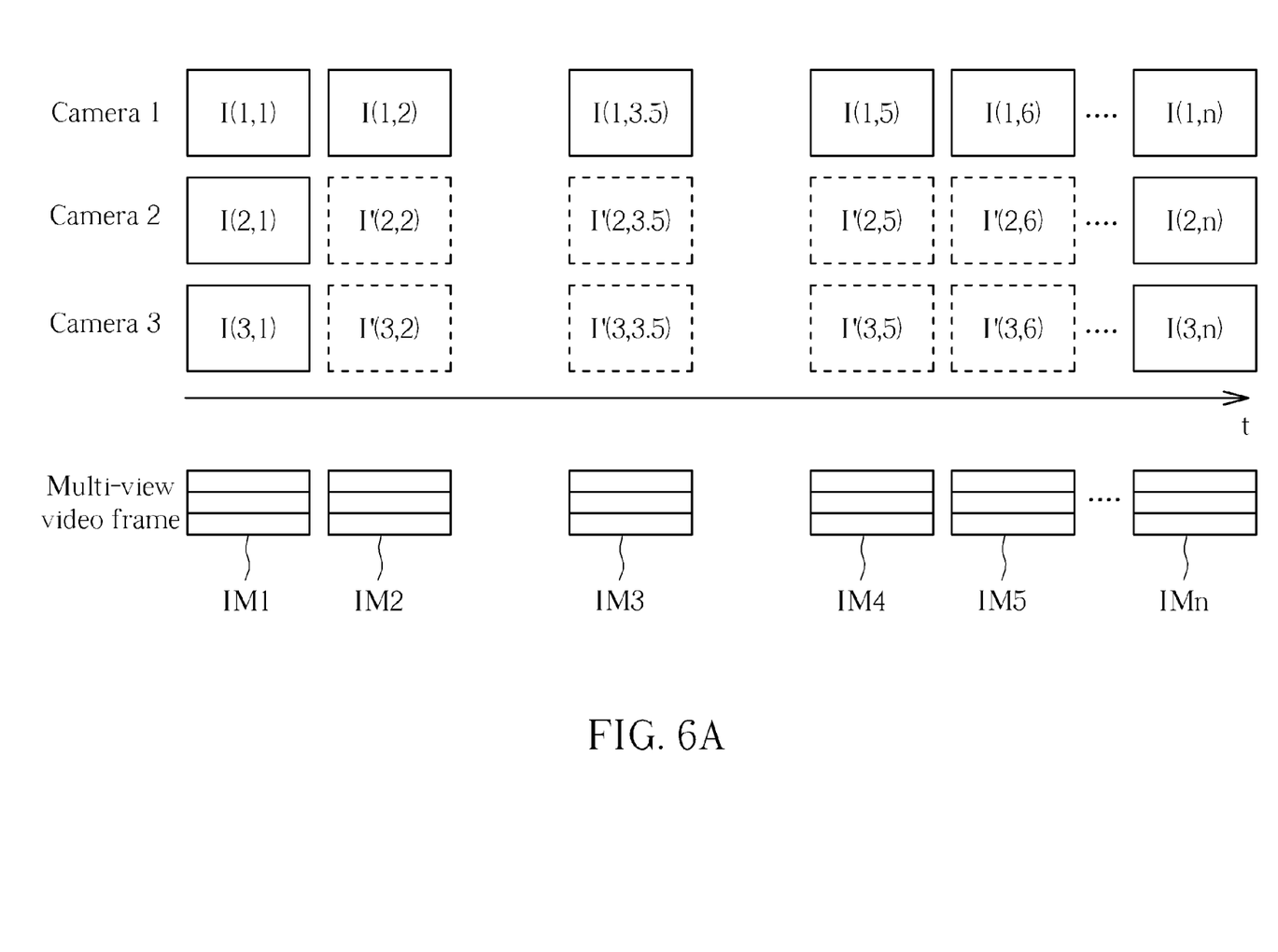
Figure 6B:
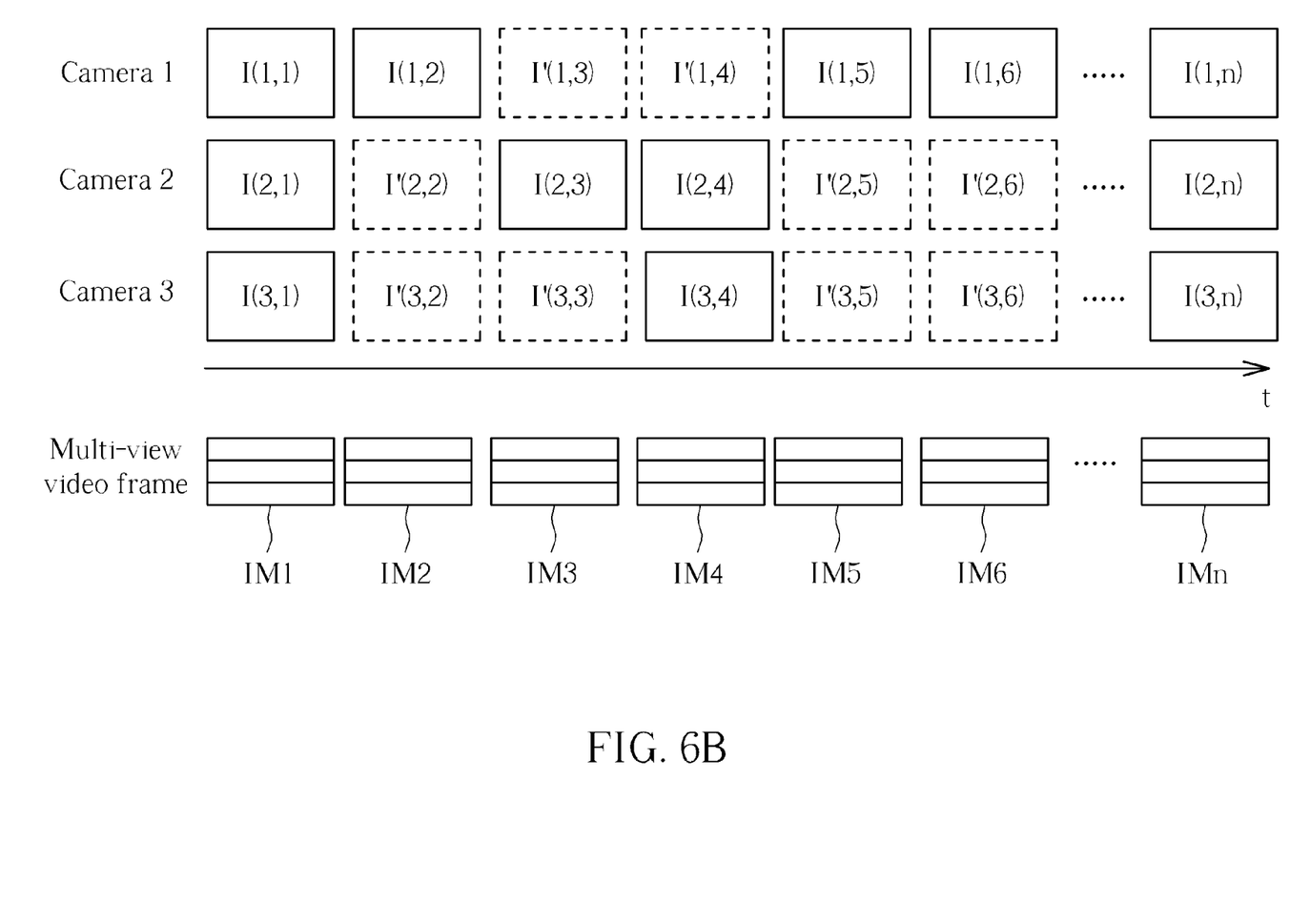

FIG. 5, FIG. 6A and FIG. 6B are schematic diagrams illustrating a video frame processing method according to still another embodiment of the present application. The cameras 1 to 3 capture the video sequences from different view angles. Referring to FIG. 5, the video frames are not synchronized. For example, the video frames of first view I(2,3), I(2,4) captured by the camera 2 exist at the timestamps t(c2,f3) and the t(c2,f4), but a video frame I(1, 3.5) captured by the camera 1 exists at the timestamp t(c1,f3.5) rather than at the timestamps t(c1,f3), t(c1,f4) corresponding to the timestamps t(c2,f3), t(c2,f4). For another example, the video frames I(1,5), I(1,6) captured by the camera 1 exist at the timestamps t(c1,f5) and the t(c1,f6), but a video frame of first view I(2, 5.5) captured by the camera 2 exists at the timestamp t(c2,f5.5) rather than at the timestamps t(c2,f5), t(c2,f6) corresponding to the timestamps t (c1,f5) and the t(c1,f6). In one embodiment, the camera 1 is still the major camera since it has the highest frame rate. However, please note that the major camera may be changed along with time, which will be described in another embodiment.

In the embodiment of FIG. 6A, the camera 1 having the highest frame rate is set as the major camera, and the video sequence of the camera 2 and camera 3 is modified to meet the video frames of the camera 1. That is, the cameras 2 and 3 are sub cameras. For example, the reference video frames of first view I'(2,2), I'(2,3.5), I'(2,5), and I'(2,6) are generated from the original video frames of first view (ex. I(2,1), I(2,3), I(2,4), I(2,5.5) and an original video frame of first view subsequent to I(2, 5.5)) of the camera 2, and geometrically constrained by the major video frames I(1,2), I(1,3.5), I(1,5), and I(1,6). Similarly, the reference video frames of second view I'(3,2), I'(3,3.5), I'(3,5), and I'(3,6) are generated from the original video frames of second view (ex. I(3,1), I(3,4) and an original video frame of second view subsequent to I(3,4)) of the camera 3, and geometrically constrained by the major video frames I(1,2), I(1,3.5), I(1,5), and I(1,6). Detail operations for generating the reference video frames of first view and second view are illustrated in above-mentioned embodiments, thus are omitted for brevity here.

Once the necessary reference video frame(s) is generated, the multi-view video frame can be produced by combining with the corresponding video frames from different cameras. For example, the multi-view video frame IM2 is generated according to the major video frame I(1,2) (an original video frame), the reference video frame of first view I'(2,2) interpolated from video frames of first view I(2,1), I(2,3) and geometrically constrained by the reference major video frame I(1,2), and the reference video frame of second view I'(3,2) interpolated from video frames of second view I(3,1), I(3,4) and geometrically constrained by the reference major video frame I(1,2). For another example, the multi-view video frame IM3 is generated according to the major video frame I(1,3.5), the reference video frame of first view I'(2,3.5) interpolated from the video frames of first view I(2,3) and I(2,4) and geometrically constrained by the reference major video frame I(1,3.5), and the reference video frame of second view I'(3,3.5) interpolated from video frames of second view I(3,1) and I(3,4) and geometrically constrained by the reference major video frame I(1,3.5). Please note the combinations of the original video frames and reference video frames generated from the original video frames are not limited to these examples, other combinations should also fall in the scope of the present application. By the methods illustrated in FIG. 6A, a multi-view video sequence can fit a frame rate the same as which of the major camera can be acquired.

In the above-mentioned embodiments, a camera with a highest frame rate is set as the major camera. However, the major camera can be set based on other standards, as above-mentioned. In one embodiment, it is checked if any camera of the multi-view camera system captures a video frame having a timestamp corresponding to a specific time. If yes, the camera is set as the major camera for the specific time. Please refer to FIG. 6B, for example, it is determined that if any camera captures a video frame having a timestamp corresponding to a specific time t2. The timestamps corresponding to the time t2 are t(c1,f2), t(c2,f2), t(c3,f2). After determining, the camera 1 is selected as the major camera for the time t2 while the cameras 2 and 3 are selected as the sub cameras, since only the camera 1 captures the video frame I(1,2) at the timestamp t(c1,f2) but the camera 2 and the camera 2 do not capture video frames at the timestamps t (c2,f2) and t(c3,f2). Therefore, a reference video frame of first view I'(2,2) is interpolated from the video frames of first view I(2,1) and I(2,3) and geometrically constrained by the video frame I(1,2). Also, a reference video frame of second view I'(3,2) is interpolated from the video frames of second view I(3,1) and I(3,4) and geometrically constrained by the video frame I(1,2). The multi-view video frame IM2 corresponding to the time t2 is generated according to the video frame I(1,2), the reference video frame of first view I'(2,2) and reference video frame of second view I'(3,2). For another example, it is determined that if any camera captures a video frame having a timestamp corresponding to a specific time t3. The timestamps corresponding to the time t3 are t(c1,f3), t(c2,f3), t(c3,f3). After determining, the camera 2 is selected as the major camera for the time t3 while the cameras 1 and 3 are selected as the sub cameras, since only the camera 2 captures the video frame I(2,3) at the timestamp t(c2,f3) but the camera 1 and the camera 3 do not capture video frames at the timestamps t(c1,f3) and t(c3,f3). Accordingly, the multi-view video frame IM3 corresponding to the time t3 is generated according to the major video frame I(2,3) (an original video frame), the reference video frame I'(1,3) interpolated from video frames I(1,2) and I(1,3.5) and geometrically constrained by the reference major video frame I(2,3), and the reference video frame of second view I'(3,3) interpolated from video frames of second view I(3,1) and I(3,4) and geometrically constrained by the reference major video frame I(2,3). Such operation of determining the major camera for each specific time can be performed via a counter, which continuously counts up (or down) at a predetermined frequency. Each time the counter counts up (or down), it is determined if any camera captures a video frame having a timestamp corresponding to the counter value (referred to as "specific time"). For example, if the counter value is 1, it is determined if any camera captures a video frame having a timestamp corresponding to a specific time t1. For another example, if the counter value is n, it is determined if any camera captures a video frame having a timestamp corresponding to a specific time tn.

In one embodiment, if more than one camera captures a video frame at a specific time, one of such cameras is selected as the major camera according to predetermined criteria. For example, in FIG. 6B, the camera 2 and the camera 3 respectively captures the video frame I(2,4), I(3,4) at the specific time t4, thus one of the camera 2 and the camera 3 can be selected as the major camera. In view of the embodiment of FIG. 6B, a multi-view video sequence with a video frame rate higher than which for each camera can be generated, since the reference video frame can be generated for each time stamp that the original video frame does not exist.

Please note, the embodiments in FIGS. 5, 6A, and 6B are explained under the situation that each camera has a video frame rate different from each other, such that the capturing time points for the video frames of each camera are different. However, in one embodiment, the cameras may have the same video frame rates but capture the video frames at different time points (that is, the capture of each video frame by different cameras is staggered in time). Also, in another embodiment, the cameras may have different frame rates but capture the video frames at different time points. Such combinations for video frame rate and video frame capturing time point can also be applied to the embodiments in FIGS. 5, 6A, and 6B to reach the same result.

Figure 7:
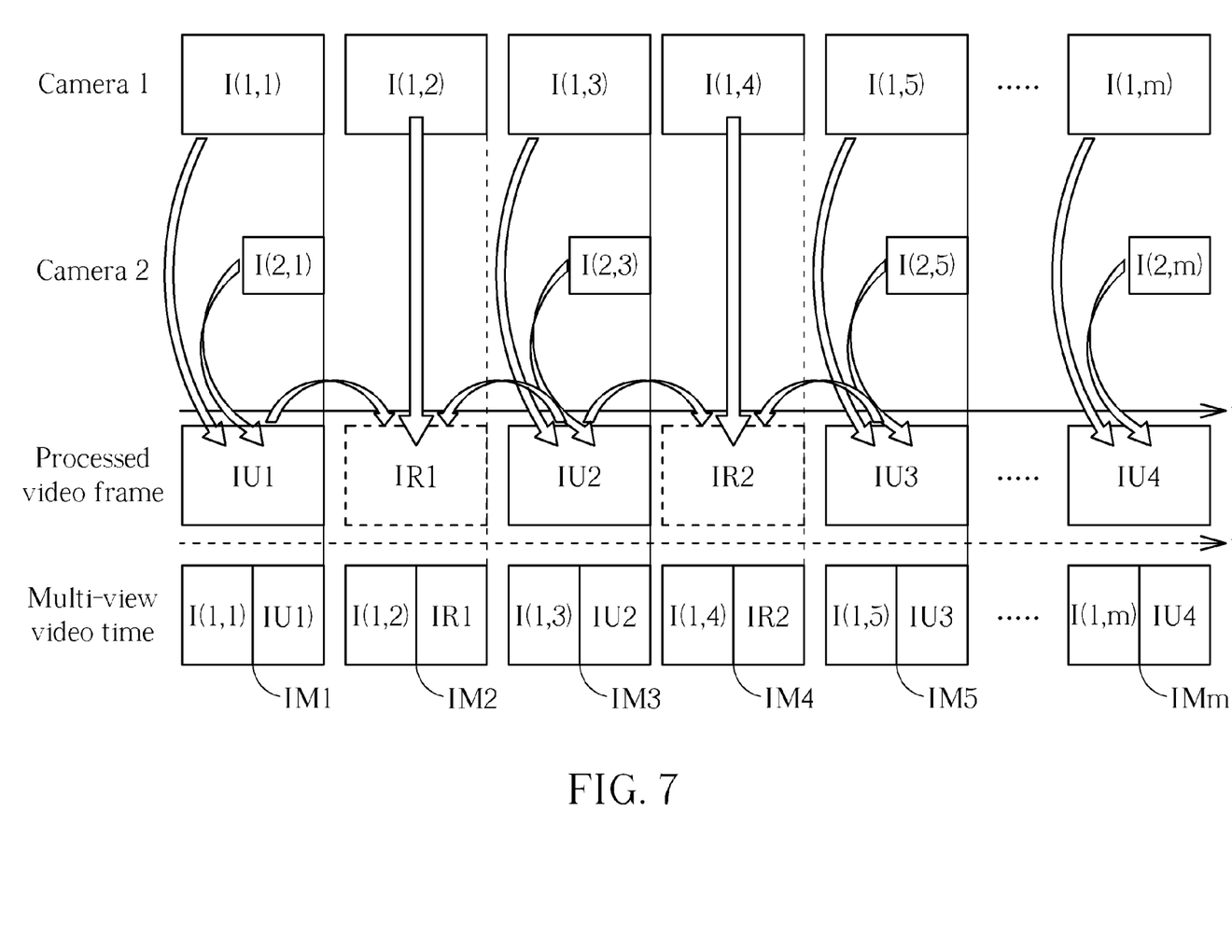
FIG. 7 is a schematic diagram illustrating a video frame processing method according to still another embodiment of the present application.
Figure 8:
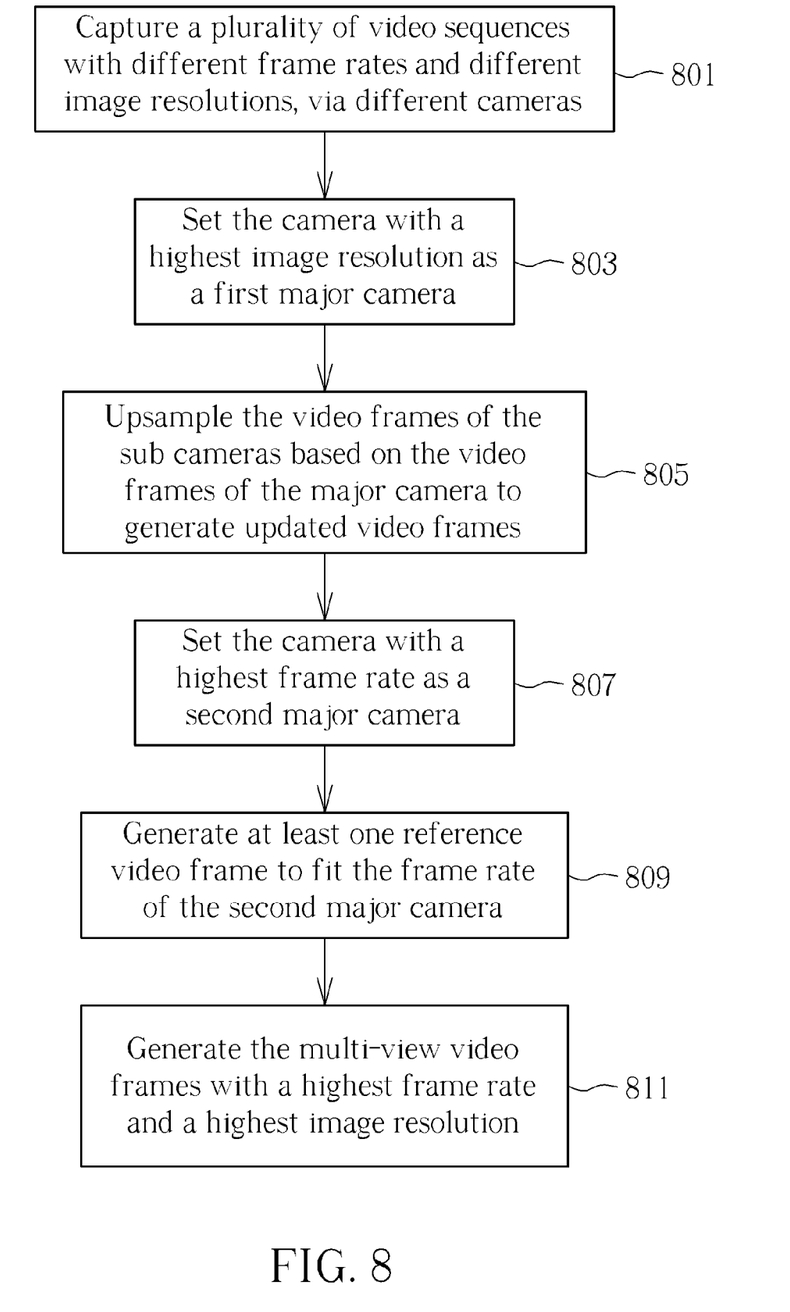
FIG. 8 is a flow chart illustrating the steps for the video frame processing method illustrated in FIG. 7, according to one embodiment of the present application.

FIG. 7 is a schematic diagram illustrating a video frame processing method according to still another embodiment of the present application. In the embodiment of FIG. 7, two cameras (camera 1, camera 2) are provided, wherein the two cameras capture the video sequences from different view angles. The camera 1 and the camera 2 have different frame rates and different video frame capturing parameters. The frame capturing parameters comprise at least one of: capturing time, exposure time, depth of field, focus, and white balance, image resolution. In the embodiments of FIG. 7 and FIG. 8, the image resolution is taken for example.

In the embodiment of FIG. 7, updated video frames are generated based on major video frames and video frames of first view first, and then a reference video frame of first view is generated according to the updated video frames. After that a multi-view video frame is generated according to the major frame and the reference video frame. For example, an updated video frame of first view IU1 is generated based on a major video frame I(1,1) captured by the major camera 1 and a video frame of first view I(2,1) captured by the camera 2. Also, a updated video frame of first view IU2 is generated based on a major video frame I(1,3) captured by the major camera and a video frame of first view I(2,3) captured by the camera 2. Besides, the reference video frame of first view IR1 is interpolated from to the updated video frames of first view IU2 and IU2 and geometrically constrained by major video frame I(1,2), for example, based on the geometry information between the cameras 1 and 2. After the reference video frame of first view IR1 is generated, a multi-view video frame IM2 is generated based on the reference video frame of first view IR1 and the major video frame I(1,2).

As above-mentioned, the video frames from the camera 1 and the video frames from the camera 2 have different image resolutions in the embodiment of FIG. 7. Therefore, the updated video frame of first view IU1 is generated via upsampling the video frame of first view I(2,1) based on the major video frame I(1,1), and the updated video frame of first view IU2 is generated via upsampling the video frame of first view I(2,3) based on the major video frame I(1,3).

The multi-view video frame in FIG. 7 can also be generated from the original video frame and the updated video frame generated from the original video frames. For example, the multi-view video frame IM1 can be generated based on the major video frame I(1,1) and the updated video frame IU1. Above-mentioned steps can be repeatedly performed to generate a multi-view video sequence comprising the multi-view video frames IM1, IM2, IM3 . . . IMm. By this way, the multi-view video sequence can have a highest frame rate and a highest image resolution.

In the foregoing embodiment, the updated video frames and the reference video frames are so called processed video frames, and each multi-view video frame is generated according to the corresponding major frame and the corresponding processed video frame.

FIG. 8 is a flow chart illustrating the steps for the video frame processing method illustrated in FIG. 7, according to one embodiment of the present application. FIG. 8 comprises the following steps:

Step 801

Capture a plurality of video sequences with different frame rates and different image resolutions, via different cameras (ex. camera 1, camera 2).

Step 803

Set the camera with a highest image resolution as a first major camera (ex. camera 1). Other camera(s) is/are sub camera(s) (ex. camera 2). However, the step 803 can select the first major camera based on other frame capturing parameters of the cameras.

Step 805

Upsample the video frames of the sub cameras based on the video frames of the major camera to generate updated video frames (ex. IU1, IU2).

Step 807

Set the camera with a highest frame rate as a second major camera.

Please note the camera with a highest frame rate in FIG. 7 is still the camera 1, however, please note the major cameras in the steps 803 and 807 can be different cameras. However, the step 807 can select the second major camera based on other camera parameters of the cameras. The camera parameters comprise frame capturing parameters (ex. resolution) and other camera parameters (ex. frame rate).

Step 809

Generate at least one reference video frame (ex. IR1, IR2) to fit the frame rate of the second major camera.

Step 811

Generate the multi-view video frames with a highest frame rate and a highest image resolution.

However, please note the embodiments in FIG. 7 and FIG. 8 are not limited to set the major cameras twice. For example, if it is sure the camera with the highest frame rate will have the highest image resolution, it needs to set the major camera for only one time.

Figure 9:
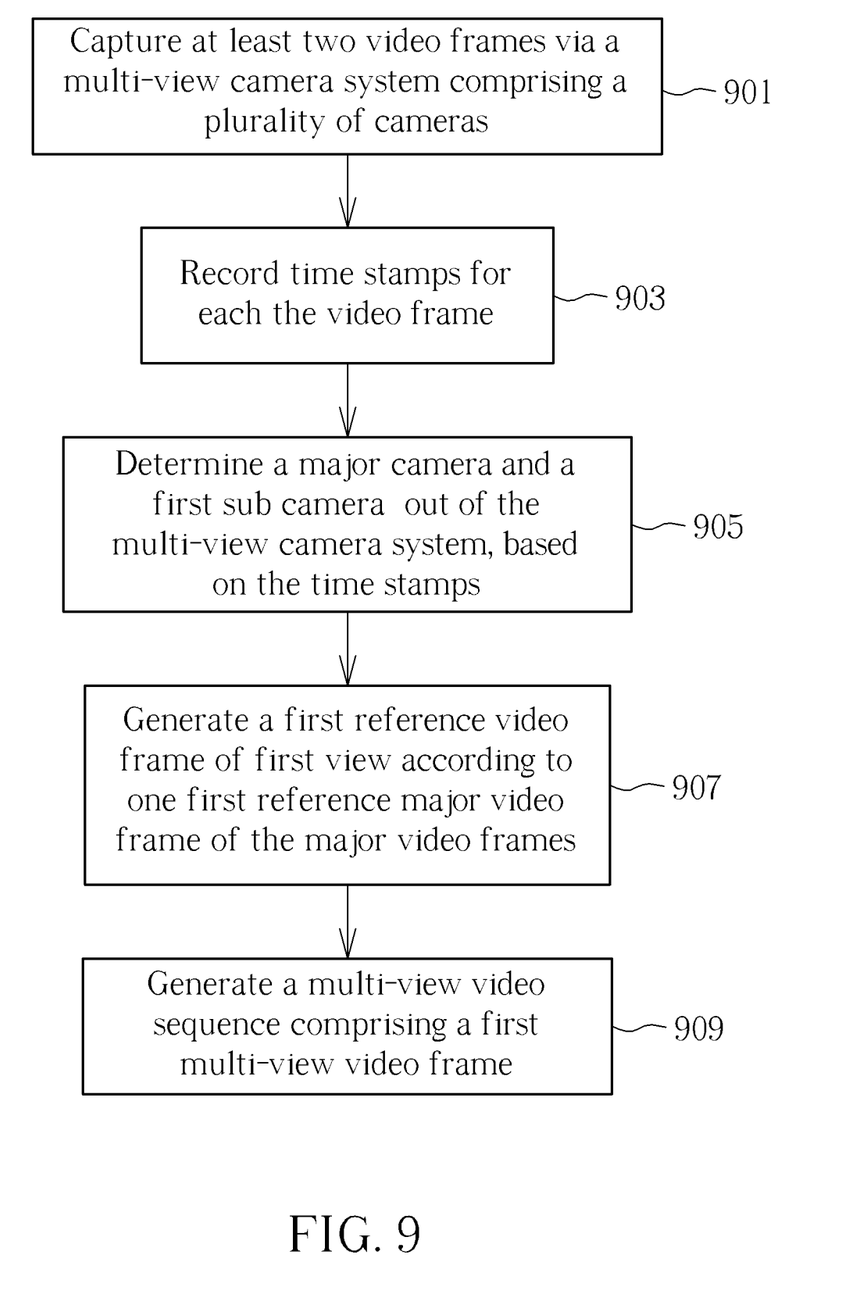
FIG. 9 is a flow chart illustrating the summarized steps for the video frame processing method, according to one embodiment of the present application.

In view of above-mentioned embodiments, a video frame processing method can be summarized as illustrated in FIG. 9. FIG. 9 comprises the following steps:

Step 901

Capture at least two video frames via a multi-view camera system comprising a plurality of cameras (ex. camera 1 and camera 2).

Step 903

Record timestamps for each the video frame.

Step 905

Determine a major camera (ex. camera 1) and a first sub camera (ex. camera 2) out of the multi-view camera system, based on the timestamps, wherein the major camera captures a major video sequence comprising at least one major video frame, the first sub camera captures a video sequence of first view comprising at least one video frame of first view.

Step 907

Generate a first reference video frame of first view (ex. I'(2,2)) according to one first reference major video frame (ex. I(1,2)) of the major video frames, which is at a reference timestamp corresponding to the first reference video frame of first view, and according to at least one the video frame of first view surrounding the reference timestamp (ex. I(2, 1)), I(2,3)).

Step 909

Generate a multi-view video sequence comprising a first multi-view video frame (ex. IM2), wherein the first multi-view video frame is generated based on the first reference video frame of first view and the first reference major video frame.

In some embodiments, a second sub camera (ex. camera m) can be further provided. Other steps can be acquired according to other embodiments, thus are omitted for brevity here.

In the foregoing embodiments, each new-generated reference video frame is constrained by the geometry information between the major camera and the corresponding sub camera.

Figure 10:
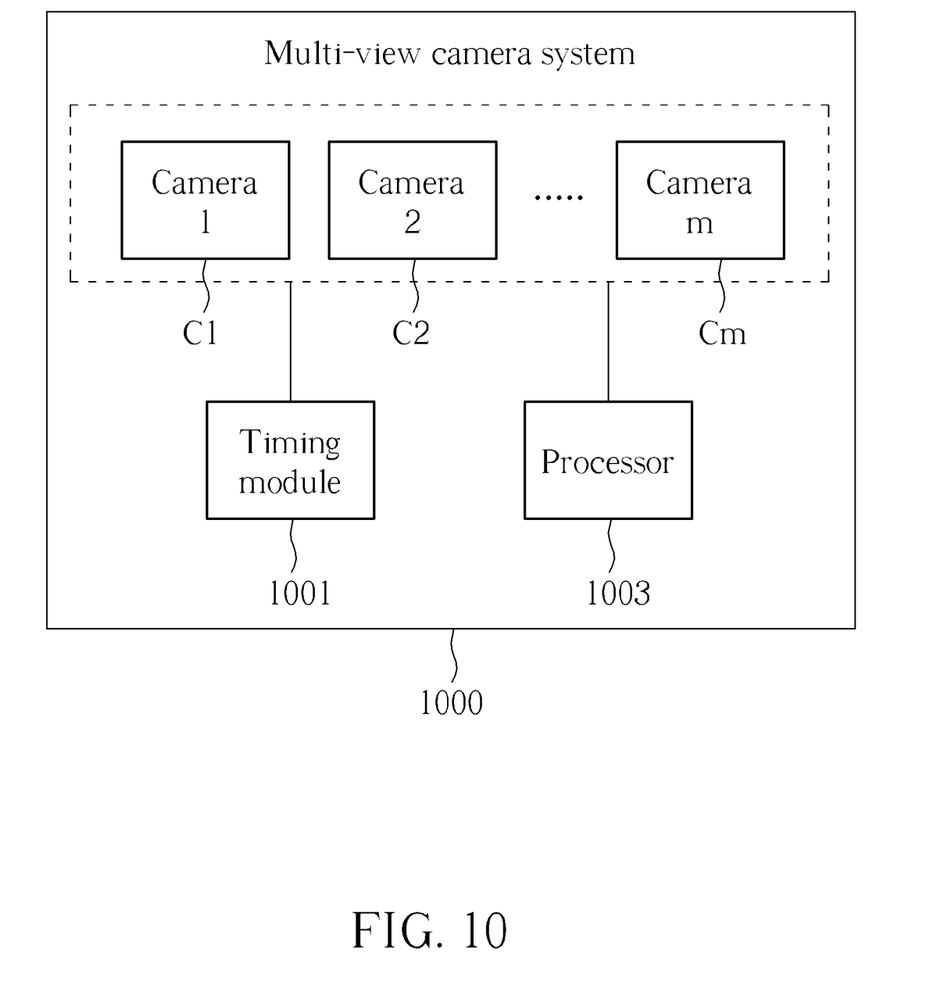
FIG. 10 is a block diagram illustrating a multi-view camera system according to one embodiment of the present application.

FIG. 10 is a block diagram illustrating a multi-view camera system 1000 according to one embodiment of the present application. As shown in FIG. 10, the multi-view camera system 1000 comprises a plurality of cameras C1 to Cm, a timing module 1001, and a processor 1003. The cameras C1 to Cm can comprise, for example, two or three cameras as illustrated in above-mentioned embodiments. It is appreciated that the multi-view camera system 1000 can comprise more than three cameras. The timing module 1001 is configured to process time related operations. For example, the timing module 1001 can record or set timestamps for the video frames. Also, the timing module 1001 can comprise the above-mentioned counter for computing the specific time. The processor 1003 is configured to perform the steps in the above-mentioned embodiments (ex. interpolating, constraining, generating the multi-view video frame). However, please note the above-mentioned embodiments are not limited to be applied to the multi-view camera system 1000 in FIG. 10.

In view of above-mentioned embodiments, the multi-view video frames can be output at a highest frame rate and/or a best image capturing parameter. Therefore, the issue for the related art can be resolved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video frame processing method, comprising:
   (a) capturing at least two video frames via a multi-view camera system comprising a plurality of cameras;
   (b) recording timestamps for each the video frame;
   (c) determining a major camera and a first sub camera out of the multi-view camera system, based on the timestamps, wherein the major camera captures a major video sequence comprising at least one major video frame, the first sub camera captures a video sequence of first view comprising at least one video frame of first view;
   (d) generating a first reference video frame of first view according to one first reference major video frame of the major video frames, which is at a reference timestamp corresponding to the first reference video frame of first view, and according to at least one the video frame of first view surrounding the reference timestamp; and
   (e) generating a multi-view video sequence comprising a first multi-view video frame, wherein the first multi-view video frame is generated based on the first reference video frame of first view and the first reference major video frame.

2. The video frame processing method of claim 1, further comprising:
   determining frame rates for the cameras of multi-view camera system according to the timestamps;
   wherein the step (c) determines the camera with a highest frame rate as the major camera.

3. The video frame processing method of claim 2, wherein the timestamps of the multi-view video sequence are synchronized with which of the major video sequence.

4. The video frame processing method of claim 1, further comprising:
   checking if any the camera of the multi-view camera system captures a video frame having a timestamp corresponding to a specific time, if yes, determining the camera capturing the video frame having the timestamp corresponding to the specific time as the major camera.

5. The video frame processing method of claim 1, wherein the first sub camera captures a first video frame of first view and a second video frame of first view, wherein the first video frame of first view is prior to the first reference video frame of first view and the second video frame of first view is after the first reference video frame of first view;
   wherein the step (d) comprises:
   generating the first reference video frame of first view by interpolating from the first video frame of first view and the second video frame of first view and constraining by geometry information between the major camera and the first sub camera.

6. The video frame processing method of claim 5, wherein the first video frame of first view is a previous frame of the first reference video frame of first view, and the second video frame of first view is a next frame of the first reference video frame of first view.

7. The video frame processing method of claim 5, wherein the timestamps of the multi-view video sequence are synchronized with which of the major video sequence.

8. The video frame processing method of claim 1, further comprising:
   (f) capturing at least one video frame of second view via a second sub camera;
   (g) generating a first reference video frame of second view according to the first reference major video frame and at least one the video frame of second view; and
   (h) generating the first multi-view video frame based on the first reference video frame of first view, the first reference video frame of second view, and the first reference major video frame.

9. The video frame processing method of claim 8, wherein at least one the video frame of second view has a timestamp different from which of the video frame of first view.

10. The video frame processing method of claim 1, further comprising:
    (f) capturing at least one video frame of second view via a second sub camera, wherein a frame rate of the major camera is higher than a frame rate of the second sub camera;
    (g) generating a first reference video frame of second view according to a second reference major video frame of the major video frames and at least one the video frame of second view; and
    (h) generating a second multi-view video frame based on the video frame of first view for generating the first reference video frame of first view, the first reference video frame of second view, and the second reference major video frame, wherein the second multi-view video frame is included in the multi-view video sequence.

11. The video frame processing method of claim 10, wherein at least one video frame of second view has a timestamp different from which of the video frame of first view.

12. The video frame processing method of claim 10, wherein the timestamps of the multi-view video sequence are synchronized with which of the major video sequence.

13. The video frame processing method of claim 1, wherein the timestamp of the first reference major video frame is the same as which of the first reference video frame of first view.

14. The video frame processing method of claim 13, further comprising performing the following step before the step (d):
    generating the first reference major video frame based on a first major video frame and a second major frame captured by the major camera;
    wherein timestamps for the first major video frame and the second major video frame are different from which for the first reference video frame of the first view.

15. The video frame processing method of claim 1, wherein the major video frame and the video frame of first view comprises different video frame capturing parameters, wherein the step (d) further comprises:
    (d1) generating a first updated video frame of first view based on a first major video frame captured by the major camera and a first video frame of first view captured by the first sub camera;

(d2) generating a second updated video frame of first view based on a second major video frame captured by the major camera and a second video frame captured by the first sub camera; and (d3) generating the first reference video frame of first view according to the first updated video frame of first view and the second updated video frame of first view.

16. The video frame processing method of claim 15, wherein the first major video frame and the first video frame of first view prior to the first reference major video frame;

wherein the second major video frame and the second video frame of first view are after the first reference major video frame.

17. The video frame processing method of claim 15, wherein the video frame capturing parameter is an image resolution, and an image resolution of the first sub camera is smaller than which of the major camera;

wherein the step (d1) upsamples the first video frame of first view based on the first major video frame to generate the first updated video frame of first view, wherein the step (d2) upsamples the second video frame of first view based on the second major video frame to generate the second updated video frame of first view.

18. The video frame processing method of claim 15, wherein the step (d3) comprises:

generating the first reference video frame of first view by interpolating from the first updated video frame of first view and the second updated video frame of first view and constraining by geometry information between the major camera and the first sub camera.

19. The video frame processing method of claim 15, wherein the video frame capturing parameter comprises at least one of: capturing time, exposure time, depth of field, focus, and white balance.

20. The video frame processing method of claim 1, wherein at least part of the major video frames comprise different image resolutions.

21. The video frame processing method of claim 1, wherein at least part of the first reference video frames of first view comprise different image resolutions.

22. A video frame processing method, comprising:
(a) capturing at least two video frames via a multi-view camera system comprising a plurality of cameras;
(b) determining a major camera and a first sub camera out of the multi-view camera system, based on camera parameters of the cameras, wherein the major camera captures a major video sequence comprising at least one major video frame, the first sub camera captures a video sequence of first view comprising at least one video frame of first view;
(c) generating a first updated video frame of first view based on a first major video frame captured by the major camera and a first video frame of first view captured by the first sub camera;
(d) generating a second updated video frame of first view based on a second major video frame captured by the major camera and a second video frame captured by the first sub camera;
(e) generating a first reference video frame of first view according to the first updated video frame of first view and the second updated video frame of first view; and
(f) generating a multi-view video sequence comprising a first multi-view video frame, wherein the first multi-view video frame is generated based on the first reference video frame of first view and a first reference major video frame of the major video frames.

23. The video frame processing method of claim 22, wherein the first major video frame and the first video frame of first view prior to the first reference major video frame;

wherein the second major video frame and the second video frame of first view are after the first reference major video frame.

24. The video frame processing method of claim 22, wherein the major video frame and the video frame of first view comprises different video frame capturing parameters, wherein the video frame capturing parameter is an image resolution, and an image resolution of the first sub camera is smaller than which of the major camera;

wherein the step (c) upsamples the first video frame of first view based on the first major video frame to generate the first updated video frame of first view, wherein the step (d) upsamples the second video frame of first view based on the second major video frame to generate the second updated video frame of first view.

25. The video frame processing method of claim 22, wherein the step (e) comprises:

generating the first reference video frame of first view by interpolating from the first updated video frame of first view and the second updated video frame of first view and constraining by geometry information between the major camera and the first sub camera.

26. The video frame processing method of claim 22, wherein the video frame capturing parameter comprises at least one of: capturing time, exposure time, depth of field, focus, and white balance.

27. The video frame processing method of claim 22, wherein the step (c) determines the major camera according to video capturing parameters of the cameras of the multi-view camera system.

28. The video frame processing method of claim 27, further comprising:

determining the major camera again according to frame rates of the cameras.

* * * * *